Nov. 22, 1960    W. F. YOUNG    2,961,529
POWER-OPERATED CLAMPING MECHANISM
Filed June 3, 1959    3 Sheets-Sheet 1
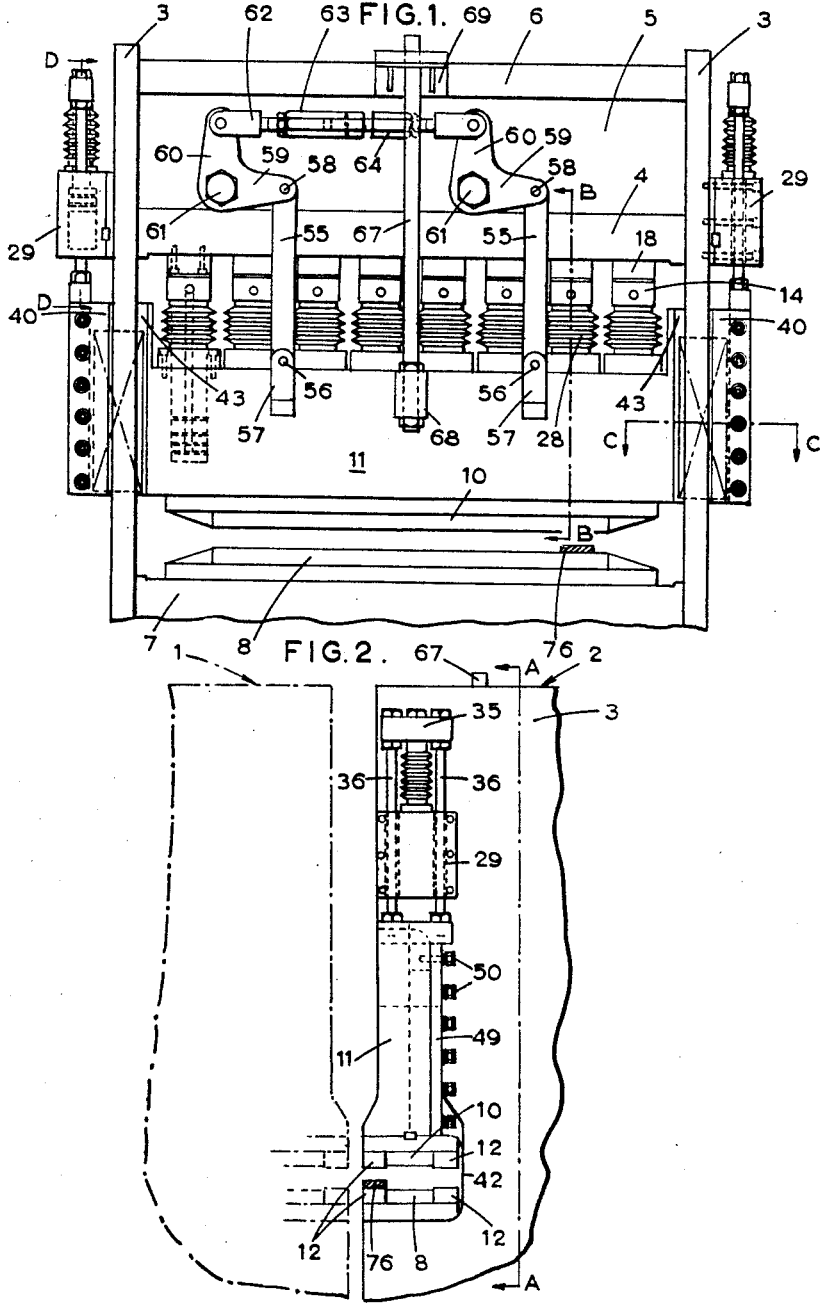
INVENTOR
William Forbes Young
BY Stevens Davis Miller & Mosher
ATTORNEYS Nov. 22, 1960
W. F. YOUNG
2,961,529
POWER-OPERATED CLAMPING MECHANISM
Filed June 3, 1959
3 Sheets-Sheet 2

INVENTOR
William Forbes Young
BY Stevens Davis Miller & Mosher
ATTORNEYS

Nov. 22, 1960

W. F. YOUNG 2,961,529

POWER-OPERATED CLAMPING MECHANISM

Filed June 3, 1959

INVENTOR
William Forbes Young

BY *Stevens Davis Miller & Mosher*

ATTORNEYS

United States Patent Office 2,961,529
Patented Nov. 22, 1960

2,961,529

POWER-OPERATED CLAMPING MECHANISM

William Forbes Young, Inverness, Scotland, assignor to Resistance Welders Limited, Inverness, Scotland Filed June 3, 1959, Ser. No. 817,762

9 Claims. (Cl. 219—161)

This invention relates to power-operated clamping mechanism as is used in flash-butt electric resistance welding machines for clamping, to the fixed and movable heads of the machine, the parts which are to be welded together. The invention is particularly concerned with clamping mechanism for clamping sheet material, which mechanism has long, flat clamping faces which require to be maintained parallel one to the other in order to provide an even clamping pressure on the material.

The object of the invention is to provide a safety device whereby the clamping pressure is automatically cut off if an attempt is made to close the clamping mechanism when there is an obstruction between the clamping faces in a non-central position, such as, for example, a tool left there by a workman.

According to the invention, a power-operated clamping mechanism includes a fixed jaw and a movable jaw, and is provided with yieldable constraining means to hold the movable jaw in a constant orientation relative to the fixed jaw during its movement towards and away from the latter, means responsive to tilting of the said movable jaw being provided to stop the closing of the clamping mechanism, the constraining means being arranged to yield under the tilting tendency of the movable jaw due to the pressure of a non-central obstruction between the jaws.

Preferably the said closure stopping means is responsive to tilting of the movable jaw in any direction; that is to say that where, as is usual, the jaws have elongated clamping faces, the closure stopping means is responsive to longitudinal tilting in both directions and to transverse tilting in both directions and to any combination of longitudinal and transverse tilting. Conveniently the closure stopping means comprises a switch striker arm rigidly secured to the movable jaw and having a plurality of switches arranged therearound, each switch having an operating member in close proximity to the arm, operation of any one of the switches causing the actuation of power control means through an electric relay.

The aforesaid yieldable constraining means comprises separate means for preventing longitudinal and transverse tilting. Preferably the means for preventing longitudinal tilting comprises a pair of spaced pivoted links connecting the movable jaw to an arm of each of two bell-crank levers, the other arms of which are connected by a link having two parts secured together by a frangible connection, such as a shear pin. Preferably also the means for preventing transverse tilting comprises a groove and guide bar assembly between the movable jaw and a fixed support, the guide bar being arranged in the groove with sufficient clearance to allow longitudinal tilting of the movable jaw and being held therein by a spring-loaded pressure plate which prevents transverse tilting of the movable jaw until displaced against the action of its loading springs.

The invention will now be described, by way of example, with reference to the accompanying drawings, in which:

Figure 1 is a front elevational view of the clamping mechanism of the movable head of an electric resistance welding machine partly in section on the line A—A of Figure 2;

Figure 2 is a view in side elevation of the movable head, the adjacent fixed head being indicated by chain lines;

Figure 3:
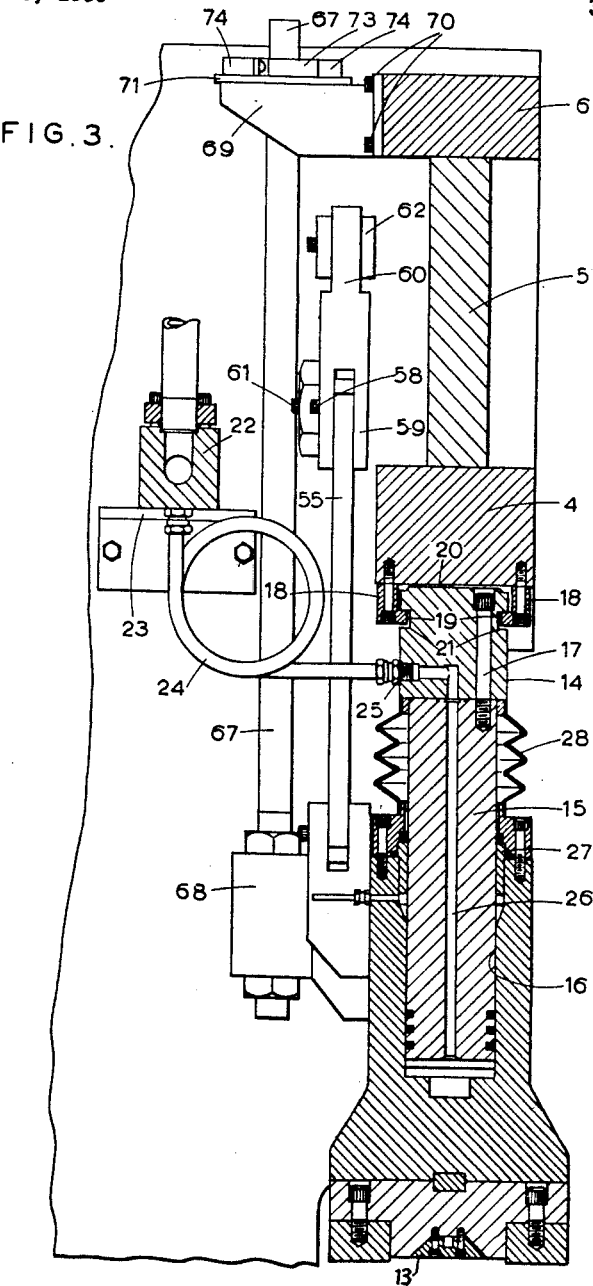
Figure 3 is a sectional view on the line B—B of Figure 1.

Referring to the drawings, the reference 1 indicates generally the movable clamping head of a flash-butt electric resistance welding machine, which head is movable horizontally so that its position may be adjusted with respect to a fixed clamping head indicated by chain lines at 2 in Figure 2. The movable head 1 includes a pair of uprights 3 comprising heavy side plates between which extends an upper fixed beam comprising three separate juxtaposed members 4, 5 and 6. A lower fixed beam 7 also extends between the uprights 3. The fixed head 2 is identical with the movable head 1 in so far as the latter is illustrated in the drawings, but it will be understood that, whereas the uprights 3 of the movable head are carried downwards to receive heavy slide bar units on which the movable head is adapted to slide, the uprights of the fixed head are incorporated in the main frame of the welding machine.

The clamping mechanism comprises a fixed jaw 8 disposed on the beam 7 and having an elongated upwardly facing clamping face, and a movable jaw 10 carried by a beam 11 and having a complementary downwardly facing clamping face. The jaws 8 and 10 are keyed and bolted to the beams, and each jaw is provided with a detachable wear-resisting insert 12 along its longitudinal edges. The movable jaw 10 has a central air blower insert 13, Figure 3. The beam 11 is guided for vertical movement by the uprights 3 as will be hereinafter described in detail.

The beam 11 forms a cylinder block to receive a row of eight plungers of a hydraulic ram which constitutes the power unit for providing clamping pressure. Referring particularly to Figure 3, each plunger comprises an upper portion 14 of square cross-section and a lower portion 15 of circular cross-section which fits within the cylinder bore 16, the plunger portions 14 and 15 being secured together by screws 17. The plungers are secured by L-shaped hangers 18 screwed to the beam 4 and engaging in grooves 19 which extend across opposite sides of the square plunger portion 14. When there is no fluid pressure in the cylinder 16, there is a slight clearance 20 between the plunger and the beam 4 and a slight clearance 21 between each hanger 18 and the lower side face and bottom of each groove 19, whereby slight tilting of the movable jaw 10 is accommodated without incurring damage. When the plungers are under pressure, the thrust is taken by the beam 4.

Pressure fluid is delivered to and exhausted from each cylinder 16 by means of a manifold 22 mounted on brackets 23 secured to the uprights 3, a pipe 24, a port 25 and an axial passage 26 in the plunger 14, 15. The pipe 24 is in the form of a single coil affording sufficient flexibility to accommodate the slight movement of the plunger 14, 15. The plunger is sealed by means of a gland 27 and a bellows member 28. Delivery and exhaust of the pressure fluid is regulated by a control valve (not shown).

Figure 5:
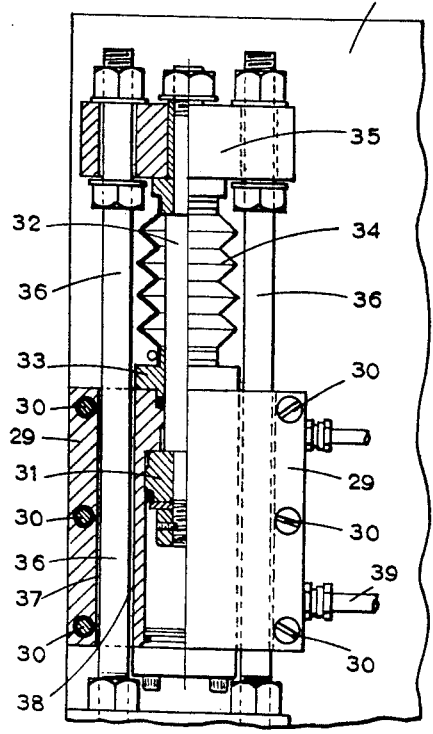
Figure 5 is a view half in side elevation and half in section on the line D—D of Figure 1, Figures 3, 4 and 5 all being to a larger scale than Figure 1.

A lifting cylinder 29 is secured by screws 30 to each of the uprights 3, as is best seen in Figure 5, and is provided with a piston 31, a piston rod 32 sealed by a gland 33 and bellows 34, and a crosshead 35 which is coupled by connecting rods 36 to the end of the beam 11. The connecting rods 36 pass through holes 37 in the cylinder 29, a clearance 38 being provided between the connecting rods and the bores to accommodate slight tilting of the movable jaw 10. Pressure fluid is delivered to and exhausted from the cylinder 29 by a pipe 39.

Figure 4:
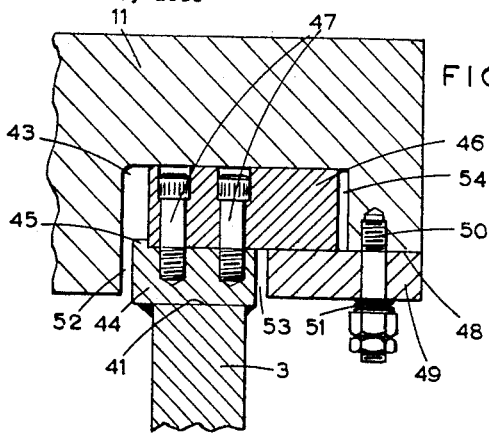
Figure 4 is a sectional view on the line C—C of Figure 1.

The movable beam 11 overlaps the upright side plates 3 and is provided at its overlapping ends with upstanding extensions 40. The side plates 3, which extend sufficiently far forwards to support the beams 4, 5 and 6, are recessed to provide an end face 41, which is clear of the overlapping beam 11, as is best seen in Figure 4. The side plates 3 are also recessed at 42 to provide access to the clamping jaws 8 and 10. A vertical groove 43, located opposite each of the side plates 3, extends over the whole depth of the beam 11 including the extensions 40. A supporting bar 44, secured to the side plate 3, extends within the groove 43 and has a shoulder 45 locating a guide bar 46 secured to the supporting bar 44 by screws 47. The guide bar 46 is in contact with the base of the groove 43, and the end of the beam 11 is so recessed as to provide a surface 48 flush with the outer face of the guide bar. The movable jaw 10 is restrained from tilting transversely by a pressure plate 49 secured to the beam 11 by a plurality of studs 50 and held against the guide bar 46 by the pressure of springs 51 on the studs 50. A clearance 52 is provided between the supporting bar 44 and the inner face of the groove 43, a clearance 53 is provided between the supporting bar 44 and the pressure plate 49, and a clearance 54 is provided between the guide bar 46 and the outer side face of the groove 43, whereby slight longitudinal tilting of the movable jaw 10 may be accommodated.

Figure 6:
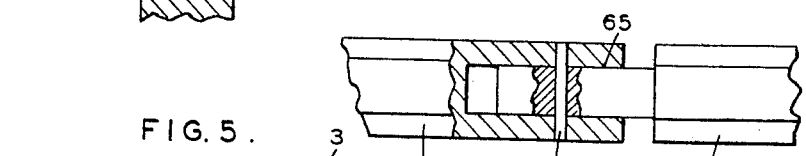
Figures 6 and 7 are views of details.

The movable jaw 10 is restrained against tilting longitudinally by a pair of spaced links 55 each of which is connected by a pivot pin 56 to a bracket 57 secured to the movable beam 11 and is connected by a pivot pin 58 to an arm 59 of one of a pair of bell-crank levers pivotally mounted at 61 on the fixed beam 5. The other arms 60 of the bell-crank levers are connected by an adjustable pivoted link 62 which includes a turnbuckle. As shown in Figure 6, the turnbuckle has two portions 63 and 64 having a spigot and socket connection 65 secured by a shear pin 66.

Figure 7:
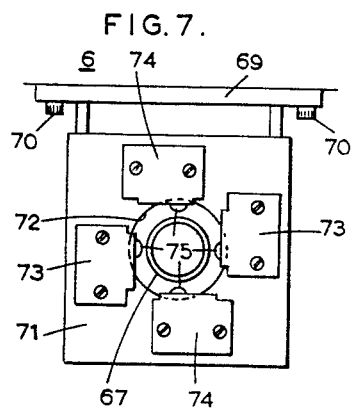

A switch striker arm in the form of an upstanding rod 67 is mounted centrally on the beam 11 by means of a bracket 68. A switch bracket 69, illustrated in Figure 7, is secured by screws 70 to the upper fixed beam 6. The switch bracket has a square platform 71 having a central opening 72 through which the striker arm protrudes, being disposed coaxially therewith. Two pairs of oppositely disposed switches 73 and 74 are mounted on the platform 71, being spaced equidistantly around the opening 72. Operating members 75 of the four switches project inwardly across the opening 72 into proximity with the striker arm 67. The arrangement is such that a line through the operating members 75 of the switch 73 is parallel to the longitudinal axis of the movable jaw 10, and a line through the operating members 75 of the switches 74 is parallel to the transverse axis of the movable jaw 10. So long as the movable jaw 10 remains untilted in any direction, the striker arm lies substantially in the centre of the opening 72 and does not engage the operating members 75 of any of the switches, but any tilting of the movable jaw will deflect the striker arm and cause it to engage the operating member of one or other of the switches, the operation of any one of which acts to close the circuit of an electric relay whereby the control valve of the hydraulic ram is actuated and the supply of pressure fluid to the cylinders 16 is instantaneously cut off. The switches are preferably micro-switches of a type that can be operated on a movement of .01 of an inch, so that the amount of tilting of the movable jaw necessary to operate the safety device is only slight.

It will be apparent that, during the normal operation of the machine, the linkage comprising the links 55, the bell-crank levers 59, 60 and the adjustable link 62 will restrain the movable jaw against tilting longitudinally, and that the spring-loaded plates 49 will prevent it from tilting transversely, so long as no substantial load tending to produce tilting comes into action. If, however, an obstruction 76 such as a tool should be left between the clamping jaws, to one side of the longitudinal centre of the latter, as illustrated in Figure 1, and an attempt be made to close the jaws, the clamping pressure, being resisted only at one end of the jaws, will tend to tilt the movable jaw and this will apply a substantial load to the shear pin 66. The shear pin will therefore yield, allowing differential movement of the two bell-crank levers and the striker arm 67 will rock to one side, operate one of the switches 73, and cause the clamping pressure to be cut off, and the movable jaw to be brought to rest.

If the obstruction 76 between the jaws be so placed that the movable jaw tends to tilt transversely, as illustrated in Figure 2, the spring-loaded plates 49 will yield, and the striker arm 67 will actuate one of the switches 74 to cut off the clamping pressure, and bring the movable jaw to rest. If the obstruction causes both longitudinal and transverse tilting, the striker arm will operate a switch 73 or a switch 74 according to whether the predominant tilting tendency is longitudinal or transverse, or it may operate a switch 73 and a switch 74 simultaneously. In any case the striker arm will operate a switch to cut off the clamping pressure before the degree of tilting is sufficient to cause damage.

It will be apparent that the switches will operate to cut off the clamping pressure at a value of that pressure depending on the strength of the shear pin in one case, and on the strength of the springs acting on the pressure plates in the other case and these values can be set so that the pressure does not rise to a sufficient value to cause any damage to the machine before the pressure is cut off. Moreover the provision of the clearances 20 and 21 at the suspension of the plungers 14, 15, the clearances 38 for the connecting rods 36, and the clearances 52, 53 and 54 at the guiding means of the beam 11, ensures that no damage occurs at these parts of the machine due to the slight tilting that is necessary to operate the safety device. When transverse tilting occurs to operate the striker arm 67, stresses will be set up in the linkage comprising the links 55 and bell-crank levers 59, 60, but the material and dimensions of the links 55 may be so chosen that flexure of the links 55 will not cause stresses beyond the elastic limit. Alternatively, stressing of the links 55 may be avoided by replacing the pivot pins 56 and 58 by ball-and-socket joints.

It will be understood that the foregoing description with reference to the accompanying drawings is given by way of example only, that modifications of the constructional details of the safety device may be made within the scope of the appended claims, and that the application of the invention is not limited to the particular type of clamping mechanism employed in the illustrated embodiment. For instance, power-operation of the clamping mechanism may be other than by a hydraulic ram, suitable control means being provided for actuation by the means responsive to tilting of the movable jaw, whereby the power unit is instantaneously cut off. If, for example, the power unit be an electric motor, the means responsive to tilting may be adapted to actuate directly a switch cutting out the motor. Instead of an electric relay between the means responsive to tilting and the power unit control means, as in the illustrated embodiment of the invention, a fluid relay or a mechanical relay may be provided, or the means responsive to tilting may act directly on means for cutting off the power supply. The jaws of the clamping mechanism are not necessarily elongated, and in this case the terms "longitudinal" and "transverse," applied to the jaws in the foregoing description, would apply to two planes at right angles. As an example of a modification of the illustrated embodiment, the grooves for guiding the movable jaw may be provided in guide members carried by the uprights, the beam carrying the movable jaw being provided with means for engaging the grooves.

I claim:

1. A power-operated clamping mechanism comprising an elongated fixed jaw, an elongated movable jaw, a plurality of pressure devices acting on said movable jaw at spaced points along its length to urge said movable jaw towards said fixed jaw, means to control said pressure devices, guide means for said movable jaw permitting longitudinal tilting thereof relative to the fixed jaw within predetermined limits, linkage means restraining said movable jaw against such tilting movement, a yielding link in said linkage means adapted to yield when subjected to a predetermined stress and allow said movable jaw to tilt, and means responsive to longitudinal tilting of said movable jaw within the limits allowed by the guide means to operate the control means so as to render said pressure devices inoperative.

2. A clamping mechanism according to claim 1, wherein the means for restraining the movable jaw from tilting longitudinally comprises a pair of spaced pivoted links connecting the movable jaw to an arm of each of two bell-crank levers, mounted on fixed pivots, the other arms of which are connected by a link having two parts secured together by a frangible connection.

3. A clamping mechanism according to claim 1, wherein means is provided for restraining the movable jaw from tilting transversely and comprises a groove and guide bar assembly between the movable jaw and a fixed support, the guide bar being arranged in the groove with sufficient clearance to allow longitudinal tilting of the movable jaw and being held therein by a spring-loaded pressure plate which prevents transverse tilting of the movable jaw until displaced against the action of its loading springs.

4. A clamping mechanism according to claim 1 further comprising upper and lower fixed beams between uprights, a clamping jaw on said lower fixed beam, a movable clamping jaw carried by a movable beam disposed between said fixed beams and guidable on said uprights, and a power unit for applying clamping pressure comprising a hydraulic ram having a plurality of plungers flexibly mounted on said upper fixed beam and fitting within cylinders disposed in said movable beam.

5. A clamping mechanism according to claim 4, wherein a hydraulic lifting cylinder is provided on each of said uprights, each provided with an upwardly extending piston rod carrying a crosshead, and connecting rods between the crosshead and the end of the movable beam, the connecting rods passing with clearance through bores in the cylinder wall.

6. A power-operated clamping mechanism comprising an elongated fixed jaw, an elongated movable jaw, a plurality of fluid pressure devices acting on said movable jaw at spaced points along its length to urge said movable jaw towards said fixed jaw, a valve to control the supply of pressure fluid to said fluid pressure devices, guide means for said movable jaw permitting longitudinal tilting thereof relative to the fixed jaw within predetermined limits, linkage means restraining said movable jaw against such tilting movement, a yielding link in said linkage means adapted to yield when subjected to a predetermined stress and allow said movable jaw to tilt, and means responsive to longitudinal tilting of said movable jaw within the limits allowed by the guide means to operate the control valve so as to cut off the fluid pressure from said fluid pressure devices.

7. A power-operated clamping mechanism comprising an elongated fixed jaw, an elongated movable jaw, a plurality of fluid pressure devices acting on said movable jaw at spaced points along its length to urge said movable jaw towards said fixed jaw, a valve to control the supply of pressure fluid to said fluid pressure devices, guide means for said movable jaw permitting longitudinal tilting thereof relative to the fixed jaw within predetermined limits, linkage means restraining said movable jaw against such tilting movement, a yielding link in said linkage means adapted to yield when subjected to a predetermined stress and allow said movable jaw to tilt, a striker arm mounted on said movable jaw, a pair of electric switches respectively operable by slight movement of the striker arm due to longitudinal tilting of said movable jaw in opposite directions, and means responsive to operation of either one of said switches to operate the control valve so as to cut off the fluid pressure from said fluid pressure devices.

8. A power-operated clamping mechanism comprising an elongated fixed jaw, an elongated movable jaw, a plurality of fluid pressure devices acting on said movable jaw at spaced points along its length to urge said movable jaw towards said fixed jaw, a valve to control the supply of pressure fluid to said fluid pressure devices, guide means for said movable jaw permitting longitudinal tilting thereof relative to the fixed jaw within predetermined limits, linkage means restraining said movable jaw against such tilting movement, a yielding link in said linkage means adapted to yield when subjected to a predetermined stress and allow said movable jaw to tilt, said guide means including resiliently loaded members holding said movable jaw against transverse tilting, and means responsive to longitudinal or transverse tilting of said movable jaw to operate the control valve so as to cut off the fluid pressure from said fluid pressure devices.

9. A power-operated clamping mechanism comprising an elongated fixed jaw, an elongated movable jaw, a plurality of fluid pressure devices acting on said movable jaw at spaced points along its length to urge said movable jaw towards said fixed jaw, a valve to control the supply of pressure fluid to said fluid pressure devices, guide means for said movable jaw permitting longitudinal tilting thereof relative to the fixed jaw within predetermined limits, linkage means restraining said movable jaw against such tilting movement, a yielding link in said linkage means adapted to yield when subjected to a predetermined stress and allow said movable jaw to tilt, said guide means including resiliently loaded members holding said movable jaw against transverse tilting, a striker arm mounted on said movable jaw and projecting therefrom in its plane of movement relative to the fixed jaw, a plurality of electric switches disposed around said striker arm and respectively operable by slight movement of said striker arm due to longitudinal or lateral tilting of said movable jaw, and means responsive to operation of any one of said switches to operate the control valve so as to cut off the fluid pressure from said fluid pressure devices.

References Cited in the file of this patent

UNITED STATES PATENTS

| | | |
|---|---|---|
| 2,636,433 | Wennberg | Apr. 28, 1953 |
| 2,710,903 | Seeloff | June 14, 1955 |
| 2,812,843 | Hummel | Nov. 12, 1957 |